United States Patent [19]

Oosterling et al.

[11] 4,170,934
[45] Oct. 16, 1979

[54] DEVICE FOR COMPRESSING CROP INTO BALES

[75] Inventors: Pieter A. Oosterling, Nieuw-Vennep; Adriaan Van Zweeden, Rijsenhout, both of Netherlands

[73] Assignee: Expert N.V., Curacao, Netherlands Antilles

[21] Appl. No.: 934,427

[22] Filed: Aug. 17, 1978

Related U.S. Application Data

[63] Continuation of Ser. No. 811,174, Jun. 29, 1977, abandoned.

[30] Foreign Application Priority Data

Jun. 30, 1976 [NL] Netherlands ......................... 7607222

[51] Int. Cl.² ........................................... B30B 15/30
[52] U.S. Cl. ..................................... 100/100; 56/344; 100/97; 100/98 R; 100/141; 100/215; 100/232; 100/233; 100/250; 100/269 R

[58] Field of Search ......................... 56/341, 343, 344; 100/97, 98, 100, 137, 138, 141, 142, 188 R, 189, 215, 232, 233, 250, 269 R

[56] References Cited

U.S. PATENT DOCUMENTS

| 313,627 | 3/1885 | Selz | 100/189 X |
|---|---|---|---|
| 2,552,888 | 5/1951 | Druetta | 100/189 |
| 2,955,529 | 10/1960 | Marble | 100/215 |
| 3,487,771 | 1/1970 | Crane | 100/45 X |
| 3,685,437 | 8/1972 | Panning | 100/233 X |
| 3,752,061 | 8/1973 | Hirsch | 100/189 X |
| 4,034,543 | 7/1977 | Voth | 100/189 X |

*Primary Examiner*—Billy J. Wilhite
*Attorney, Agent, or Firm*—John P. Snyder

[57] ABSTRACT

A device for compressing crop into bales comprising a compression chamber having an inlet opening and a pressing member adapted to reciprocate along said opening and feeder mechanism for introducing the crop through the inlet opening into the compression chamber, which device is intended for making bales having a high specific weight; the device is able to be operated continuously.

18 Claims, 2 Drawing Figures

DEVICE FOR COMPRESSING CROP INTO BALES

This is a continuation of application Ser. No. 811,174 filed June 29, 1977, now abandoned.

The invention relates to a device for compressing crop into bales comprising a compression chamber having an inlet opening and a pressing member adapted to reciprocate along said opening and a feeder mechanism for introducing the crop through the inlet opening into the compression chamber.

A device of the kind set forth is particularly intended for making bales having a high "specific weight", which means that a large quantity of crop introduced into the compression chamber can be compressed into a bale by a single stroke of the pressing member. Owing to the reciprocatory movement of the pressing member such a pressing movement is not continuous, which may hinder a continuous operation.

The invention has for its object to provide a device which permits of operating continuously even with large quantities of received crop per unit time.

According to the invention such a device is distinguished by an auxiliary space contiguous to the compression chamber for temporarily receiving the crop supplied by the feeder mechanism and by a conveying member for moving the crop from the auxiliary space into the compression chamber.

Feeding of the crop can be continued undiminished because the crop is temporarily held in the auxiliary space whilst the pressing member is moving. As soon as the pressing member has arrived at the starting position of the compression movement, the conveying member together with the feeder mechanism will convey the crop into the compression chamber, upon which a new compression movement can be performed and a new bale can be formed.

According to the invention the conveying member may be formed in a very simple manner by a wall portion of the compression chamber which is adapted to move into the auxiliary space. When the pressing member approaches its end position, part of the wall of the compression chamber need no longer operate as part of the compression chamber so that the wall portion behind the pressing member can draw back into the auxiliary space. As soon as the pressing member has returned into the starting position, the wall portion as part of the compression chamber moves back, whilst the assembled crop is directly introduced into the compression space. When a sufficient quantity of crop is received in the auxiliary space the crop can be pre-compressed in the compression space so that by the compression proper the bale will have a high specific weight.

In order to prevent the crop from getting behind the wall portion, the wall portion is connected with a guide element for temporarily closing the access to the auxiliary space.

In a preferred embodiment of the invention the movable wall portion is arranged on the bottom side of the compression chamber and adapted to pivot about an axis extending transversely of the direction of compression and located at a distance from the feeder mechanism. With this disposition the path of movement of the crop in the device is restricted.

As an efficient guide element a flexible flap may be used between the edge of the movable bottom located opposite the pivotal shaft and a wall portion of the feeder mechanism.

Further features and advantages of the invention will be apparent from the following description of the Figures showing an embodiment.

Figure 1:
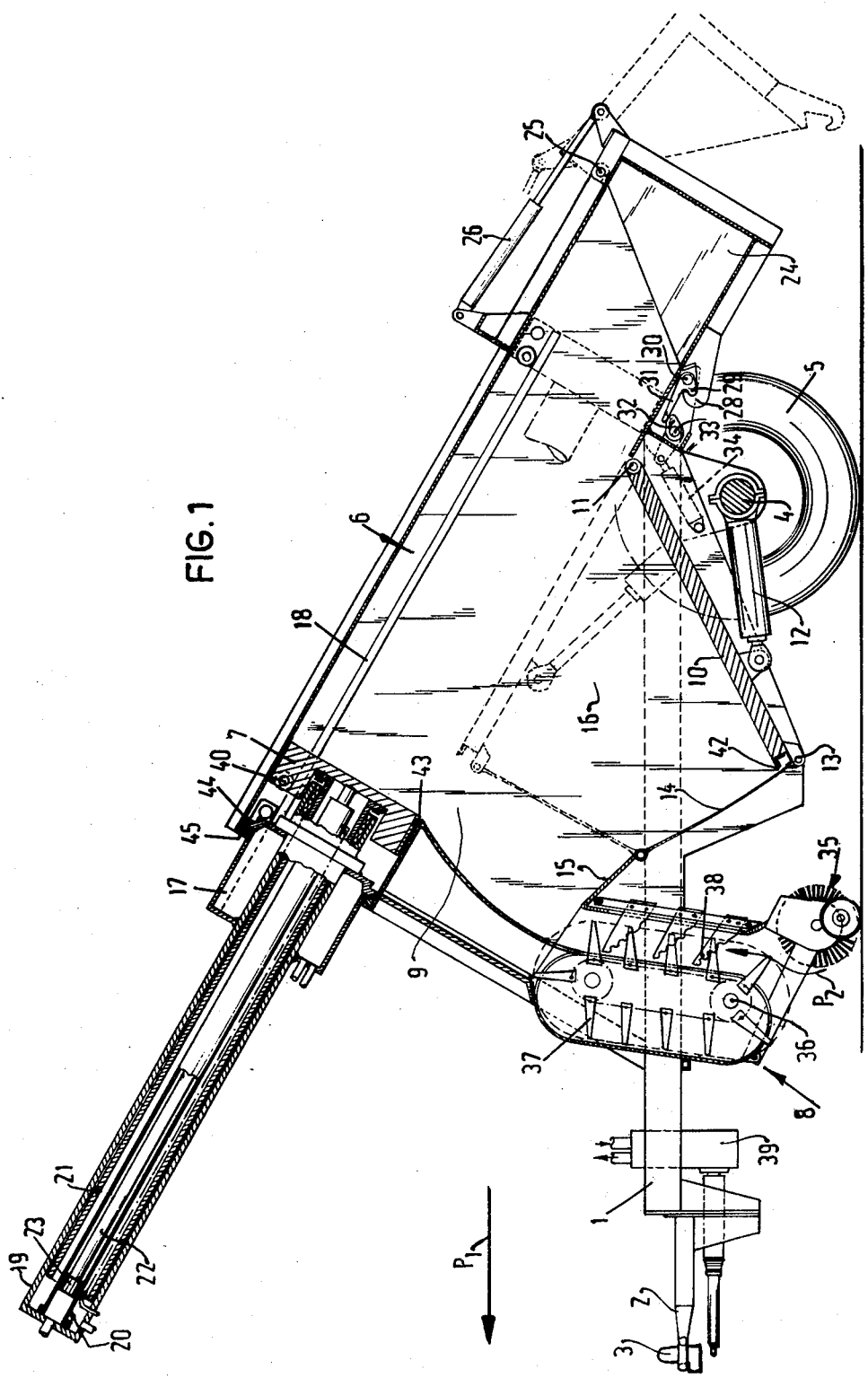
FIG. 1 is a standing sectional view of a drawn, mobile baling device.

The device shown in the Figures is suitable for being drawn by any vehicle in the direction of the arrow P1. The frame 1 of the device is provided for this purpose with a draw eyelet 2 receiving the drawhook 3 of the vehicle. The frame 1 is provided on the rear side with an axle 4 having ground wheels 5 at its ends.

The baling device carried by the frame 1 mainly comprises a compression chamber 6, a compressing plunger 7 adapted to reciprocate in the direction of length of the compression chamber and a feeder mechanism 8, which picks up the crop from the ground and elevates it to the auxiliary space 16.

The bottom of the compression chamber 6 is partly pivotable. This pivotable portion is designated by 10 and it is pivotable up and down about an axis transverse of the direction of compression 11 by means of a pistoh-cylinder mechanism 12. FIG. 1 shows the bottom portion 10 in the tilted down position by solid lines and in the tilted up position by broken lines. The end 13 of the bottom portion 10 remote from the pivotal shaft 11 is connected through a flexible element 14 with a wall portion 15 of the feeder mechanism 8.

The auxiliary space 16 according to the main feature of this invention for the temporary storage of the crop is bounded in the embodiment shown in FIG. 1 by the bottom wall portion 10 and the flexible element 14 indicated by broken lines on the bottom side. The sidewalls of the auxiliary space 16 register with those of the compression chamber 6.

The plunger 7 is supported in a carrier 17, which is adapted to slide like the plunger 7 in the direction of length of the compression chamber 6. A correct guiding of the plunger 7 as well as of the carrier 17 is ensured by a rail 18 arranged on the inner sides of the two sidewalls of the compression chamber 6.

The hydraulic cylinder for the reciprocatory movement of the plunger 7 and the carrier 17 is a two-stage cylinder in the embodiment shown. The cylinder comprises for this purpose an outer cylinder 19 and a cylinder 20 arranged at the bottom of the former. The plunger 7 is, therefore, provided with a cylindrical plunger rod 21 co-operating with the outer cylinder 19 and with a plunger rod 22 co-operating with the inner cylinder 20. The outermost plunger rod 20 as well as the innermost 22 are fastened to the plunger 7. This double structure serves to attain a sufficiently high speed of the plunger 7 at the beginning of the compression stroke and to obtain a sufficiently high pressing force at the end of the compression stroke. For this purpose the fluid will in the first instance be fed to the inner cylinder 20 so that at a given fluid displacement a comparatively high speed of the plunger 7 is obtained. By a pressure dependent valve of known type (not shown) the fluid supply will be transferred, at a given counter-pressure on the plunger 7, to the outer cylinder 19 so that with the same fluid displacement an appreciably higher pressing force, but a smaller shift in place be imparted to the plunger 7. On the other hand the return stroke of the plunger 7 will only be achieved by a fluid supply to the other side of the piston 23 fastened to the plunger rod 22 in the cylinder 20 so that this return stroke can be performed comparatively rapidly.

In the embodiment shown the support 17 is constructed in the form of a fluid sump for the cylinders 19 and 20 so that the fluid conduits are considerably shortened.

At the end remote from the inlet opening 9 the compression chamber 6 is provided with a pivotable part 24, which is adapted to pivot about a shaft 25 extending transversely of the direction of compression. The pivotal movement is performed by means of a piston-cylinder system 26 on the top side of the compression chamber 6 so that the pivotable part 24 can be turned from the closed position indicated by solid lines into the open position indicated by broken lines.

The pivotable part 24 can be locked in position by locking means 27 on the lower side of the compression chamber 6. These locking means 27 comprise a plurality of hook-like members 28 fastened to the pivotable part 24, a cam 29 joining the hook. The cam 29 is adapted to turn about a shaft 30, fastened to the bottom wall of the compression chamber 6. The cam 29 is provided with a control-arm 31, which is locked at its free end by a second cam 32. The number of cams 32 is, of course, equal to the number of cams 30 and of the hook-like members 28. The cams 32 are fastened to a common shaft 33, which is rotatably journalled with respect to the compression chamber 6 and which can be turned by means of a piston-cylinder system 34.

The pressing device according to the invention may be provided with any feeder mechanism 8. The embodiment shown comprises a pick-up member 35, which elevates the crop from the ground to an elevator 36 formed by an endless element passing around two reversing wheels, said elements being provided with projecting catches 37. The direction of rotation of the elevator is such that the catches 37 shown on the right-hand side in FIG. 1 move upwardly in the elevator channel.

The elevator members 37 may be constructed in the form of rakes, whilst in the elevator channel stationary cutting elements 38 may be provided, which extend between the tines of the rake-shaped member 37 during the rising movement of the elements 37. Thus the crop is cut to size.

The side 13 of the bottom wall portion 10 is provided with a knife-shaped peripheral part 42. Together with a knife-shaped peripheral part 43 fastened to the bottom side of the plunger 7 a scissor effect is obtained when the bottom 10 is in the tilted-up position and the plunger moves along the inlet opening 9 at the initiation of the compression. Thus long stems are cut. It is advisable to lock the bottom wall portion 10 in the tilted-up position in order to ensure a satisfactory scissor-effect.

The device depicted above operates as follows:

The position shown in FIG. 1 is the starting position prior to the pressing operation. When the device moves in the direction of the arrow P1, the crop will be moved by the pickup member 35 in the direction of the arrow P2 into the elevator channel of the elevator mechanism 8, where it is engaged by the catches 37 and where it is cut to size, when the knife-shaped members 38 are provided. Subsequently the crop enters the space bounded by the wall 15, the flexible element 14, the tilted-down bottom portion 10 and the sidewalls and the top wall of the compression chamber 6. The introduction of crop is continued until a predetermined quantity and/of density and/or weight is attained, at which instant the bottom portion 10 is urged upwards by the cylinder 12 into the position indicated by broken lines in FIG. 1. This movement produces a first densification of the crop. Locking of the part 24 is designed so that it is performed fully automatically and with great reliability. When the part 24 is turned into the closing position by means of the cylinder 26, the hooks 28 first exert pressure on the levers 31 which thus turn in the anti-clockwise direction. The locking cam 29 already engages the hook. Finally the levers 31 are locked in position by the cams 32.

Subsequently the two-stage cylinder 19,20 will become with high speed into the topmost position. Immediately after the discharge of the bale part 24 is closed. The device is then ready for compressing a new bale.

It will be obvious that the successive actuation of the various cylinders of the device may be completely performed by programming. The cylinders may be fed from one centre by means of a fluid pump 39 driven by the traction vehicle, whilst various time-controlled valves (not shown) regulate the energization of the various cylinders.

Figure 2:
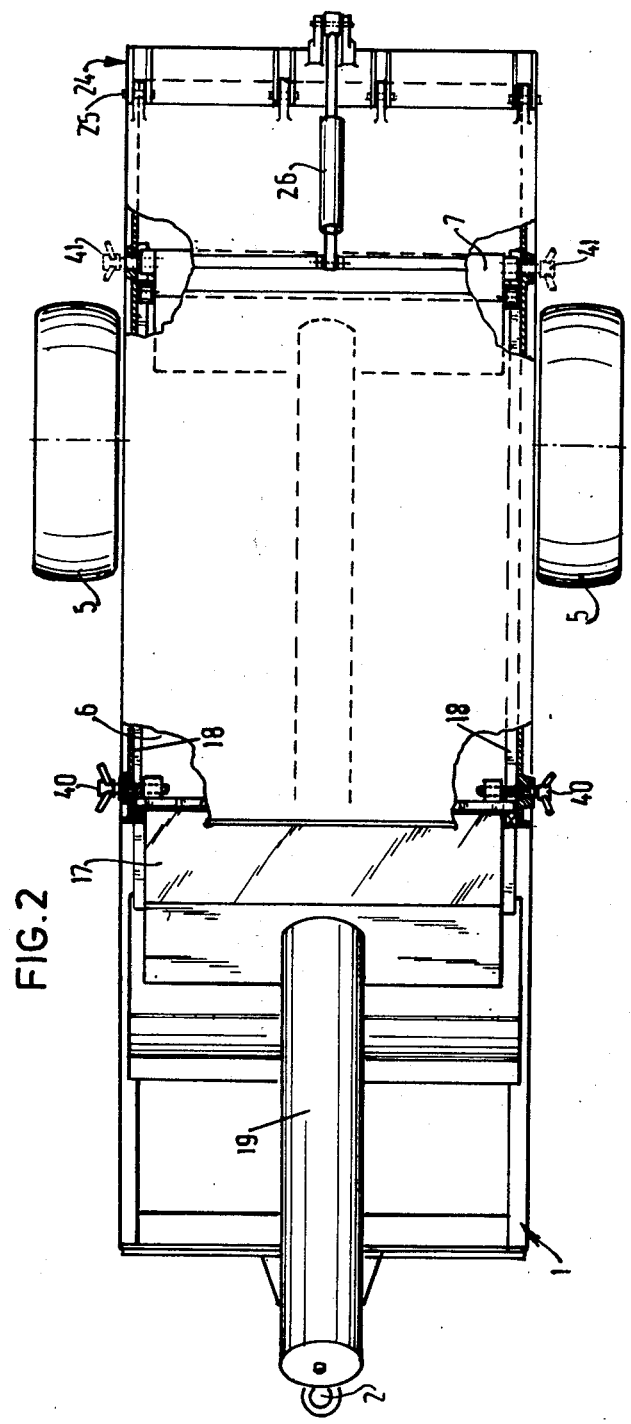
FIG. 2 is a plan view of the device shown in FIG. 1.

The position shown in FIG. 1 is that in which the device is suitable for the continuous compression of bales of crop on the field. If the device has to be transported on the road, the whole plunger 7 with the cylinders 19 and 20 as well as the sump 17 can be sunk into the compression chamber 6, to which end first the plunger 7 is moved down into the position indicated by the broken line. Subsequently the lock bolts 40 on either side of the compression chamber 6 are unlocked (see FIG. 2), the plunger 7 is locked by means of the lock bolts 41 and during the ascending plunger movement the unit 17 will be drawn into the compression chamber. The return to the operative position is performed in the reverse sense. The required reaction force for the compressing force is absorbed by a flange 44 secured to the support 17 and engaging an inwardly extending rim 45 of the compression chamber.

Within the scope of the invention other embodiments may be designed. For example, the auxiliary chamber 16 need not be arranged beneath the compression chamber 6; the auxiliary space 16 may as well be disposed at the side of the chamber 6 or on the top side.

The flexible element 14 need not be elastic, it may be constructed in the form of a slide. Moreover, the hydraulic cylinders may be replaced by any other driving system.

What is claimed is:

1. A mobile device for baling crops, comprising in combination:

a wheel-supported frame adapted to be travelled over the ground;

a generally horizontal compression chamber on said frame, said compression chamber having a discharge end portion of generally rectangular cross section and an intermediate portion of generally channel-shaped cross section smoothly merging with said discharge end portion such that the open side of the intermediate portion defines a side opening for the compression chamber;

a closure member pivotally carried by said discharge end portion normally closing same to define a well within which a compressed bale is to be formed;

a plunger having a cross section substantially filling said discharge end portion of the compression chamber and having a length much less than the length of said side opening of the compression chamber;

means for intermittently moving said plunger back and forth between a retracted position beyond said side opening remote from said discharge end portion and an extended position within said well;

an auxiliary space for receiving a crop to be transferred in preliminarily compressed condition through said side opening into the confines of said compression chamber, said space being defined by extensions of the parallel side walls of said intermediate portion, by a transverse wall portion extending between said extensions and projecting laterally away from said side opening of said compression chamber, and by a movable portion, said movable portion being mounted for movement between a retracted position in which said auxiliary space is formed and a closed position in which it defines, with said side walls of the compression chamber, an extension of said well, said movable portion closing off at least a major portion of said side opening when in its closed position;

feeder means for continuously feeding crop toward said transverse wall portion at a position laterally spaced from said side opening; and drive means for moving said movable portion from its retracted position to its closed position prior to movement of said plunger to its extended position whereby crop is transferred laterally from said auxiliary space into preliminarily compressed condition within said compression chamber ahead of said plunger, said drive means returning said movable portion to its retracted position when said plunger is within said well whereby to reestablish said auxiliary space to accommodate the crop continuously fed into the device.

2. The device as defined in claim 1 wherein said movable portion is pivotally mounted between said extensions at that end of said side opening remote from said transverse wall portion, said movable portion extending generally laterally away from said side opening when in its retracted position.

3. The device as defined in claim 2 wherein said movable portion is of a length substantially reaching said transverse wall portion when in its closed position, and a guide element carried by that swingable end of the movable portion remote from the pivoted end thereof for forming, with said transverse wall portion, an accumulating space when said movable portion is in its closed condition.

4. The device as defined in claim 3 wherein said guide element is flexible and is anchored at opposite ends respectively between said extensions and to said swingable end of the movable portion.

5. The device as defined in claim 1 wherein said side opening is at the bottom of said compression chamber and said auxiliary space is located immediately therebelow.

6. The device as defined in claim 2 wherein said side opening is at the bottom of said compression chamber and said auxiliary space is located immediately therebelow.

7. The device as defined in claim 3 wherein said side opening is at the bottom of said compression chamber and said auxiliary space is located immediately therebelow.

8. The device as defined in claim 4 wherein said side opening is at the bottom of said compression chamber and said auxiliary space is located immediately therebelow.

9. The device as defined in claim 8 wherein said compression chamber inclines downwardly toward said well.

10. A mobile device for baling crops, comprising in combination:

a wheel-supported frame adapted to be travelled over the ground;

a generally horizontal compression chamber on said frame, said compression chamber having a discharge end portion of generally rectangular cross section and an intermediate portion of generally channel-shaped cross section smoothly merging with said discharge end portion such that the open side of the intermediate portion defines a side opening for the compression chamber;

a plunger having a cross section substantially filling said discharge end portion of the compression chamber and having a length much less than the length of said side opening of the compression chamber;

means for intermittently moving said plunger back and forth between a retracted position beyond said side opening remote from said discharge end portion and an extended position within said discharge end portion;

an auxiliary space for receiving a crop to be transferred in preliminarily compressed condition through said side opening into the confines of said compression chamber, said space being defined by extensions of the parallel side walls of said intermediate portion, by a transverse wall portion extending between said extensions and projecting laterally away from said side opening of said compression chamber, and by a movable portion, said movable portion being mounted for movement between a retracted position in which said auxiliary space is formed and a closed position in which it defines, with said side walls of the compression chamber, an extension of said discharge end portion, said movable portion closing off at least a major portion of said side opening when in its closed position;

feeder means for continuously feeding crop toward said transverse wall portion at a position laterally spaced from said side opening; and drive means for moving said movable portion from its retracted position to its closed position prior to movement of said plunger to its extended position whereby crop is transferred laterally from said auxiliary space into preliminarily compressed condition within said compression chamber ahead of said plunger, said drive means returning said movable portion to its retracted position when said plunger is within said discharge end portion whereby to reestablish said auxiliary space to accommodate the crop continuously fed into the device.

11. The device as defined in claim 10 wherein said movable portion is pivotally mounted between said extensions at that end of said side opening remote from said transverse wall portion, said movable portion extending generally laterally away from said side opening when in its retracted position.

12. The device as defined in claim 11 wherein said movable portion is of a length substantially reaching said transverse wall portion when in its closed position, and a guide element carried by the swingable end of the movable portion remote from the pivoted end thereof for forming, with said transverse wall portion, an accumulating space when said movable portion is in its closed condition.

13. The device as defined in claim 12 wherein said guide element is flexible and is anchored at opposite ends respectively between said extensions and to said swingable end of the movable portion.

14. The device as defined in claim 10 wherein said side opening is at the bottom of said compression chamber and said auxiliary space is located immediately therebelow.

15. The device as defined in claim 11 wherein said side opening is at the bottom of said compression chamber and said auxiliary space is located immediately therebelow.

16. The device as defined in claim 12 wherein said side opening is at the bottom of said compression chamber and said auxiliary space is located immediately therebelow.

17. The device as defined in claim 13 wherein said side opening is at the bottom of said compression chamber and said auxiliary space is located immediately therebelow.

18. The device as defined in claim 17 wherein said compression chamber inclines downwardly toward said well.

* * * * *